(12) United States Patent
Fujiyoshi

(10) Patent No.: US 8,363,099 B2
(45) Date of Patent: Jan. 29, 2013

(54) MICROSCOPE SYSTEM AND METHOD OF OPERATION THEREOF

(75) Inventor: Kouji Fujiyoshi, Tokyo (JP)

(73) Assignee: Olympus Corporation, Tokyo (JP)

( * ) Notice: Subject to any disclaimer, the term of this patent is extended or adjusted under 35 U.S.C. 154(b) by 505 days.

(21) Appl. No.: 12/627,337

(22) Filed: Nov. 30, 2009

(65) Prior Publication Data

US 2010/0171809 A1 Jul. 8, 2010

(30) Foreign Application Priority Data

Dec. 8, 2008 (JP) ................................. 2008-312554

(51) Int. Cl.
*H04N 5/253* (2006.01)
(52) U.S. Cl. ........................................... 348/79; 348/80
(58) Field of Classification Search ......................... None
See application file for complete search history.

(56) References Cited

U.S. PATENT DOCUMENTS

| 7,778,485 | B2* | 8/2010 | Zeineh et al. | 382/284 |
|---|---|---|---|---|
| 7,949,161 | B2* | 5/2011 | Kawanabe et al. | 382/128 |
| 2004/0047033 | A1 | 3/2004 | Nakagawa | |
| 2004/0114218 | A1* | 6/2004 | Karlsson et al. | 359/368 |
| 2005/0089208 | A1 | 4/2005 | Dong et al. | |
| 2006/0045388 | A1 | 3/2006 | Zeineh et al. | |
| 2007/0036462 | A1 | 2/2007 | Crandall et al. | |
| 2009/0244697 | A1 | 10/2009 | Tümpner | |

FOREIGN PATENT DOCUMENTS

| JP | 2001-274973 | 10/2001 |
|---|---|---|
| JP | 2005-266718 | 9/2005 |
| JP | 2007-024927 | 2/2007 |
| WO | WO 2007/022961 A1 | 3/2007 |

OTHER PUBLICATIONS

Partial European Search Report dated Jun. 16, 2010.

* cited by examiner

*Primary Examiner* — John B. Walsh
(74) *Attorney, Agent, or Firm* — Scully, Scott, Murphy & Presser, P.C.

(57) ABSTRACT

A microscope system for obtaining an image having a wide view angle by repeatedly capturing an image with an objective lens having a high magnification while moving a stage, and by connecting captured images having a small view angle including a stage, a stage driving unit, a stage position detecting unit, an image capturing unit, a position to be reached determining unit for determining a position to be reached which is the next image capturing position of the stage on the basis of the state of the captured image and the position of the stage at which the image is captured, and a stage move guiding unit for prompting a user to move the stage to the position to be reached on the basis of the detected position of the stage and the determined position to be reached.

7 Claims, 17 Drawing Sheets

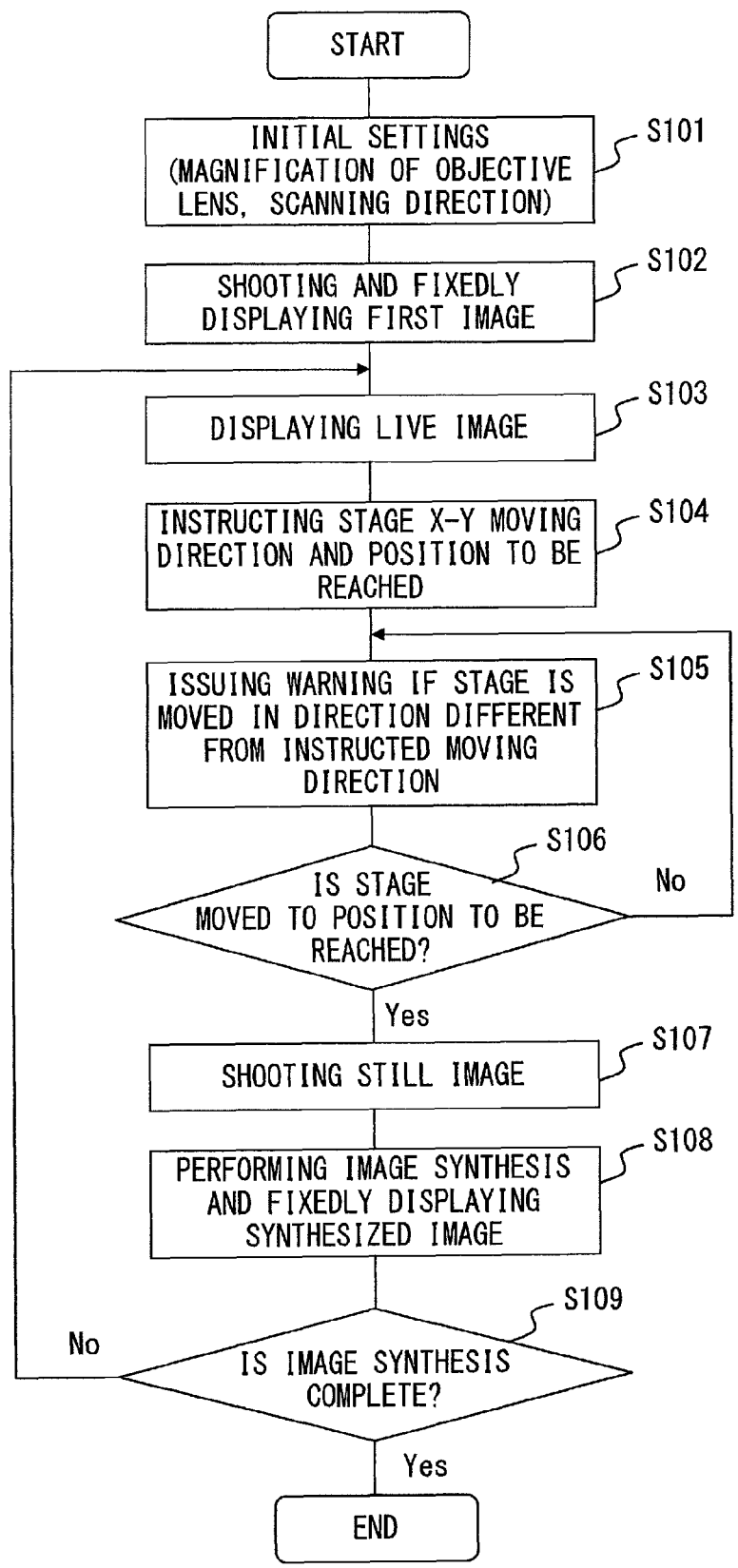
F I G. 2

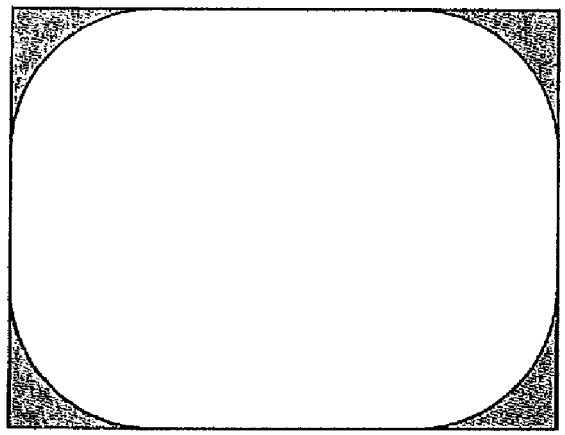
SHADING STATE
F I G. 9

PREPARING FOR SAMPLE 100 IN
GRID PATTERN
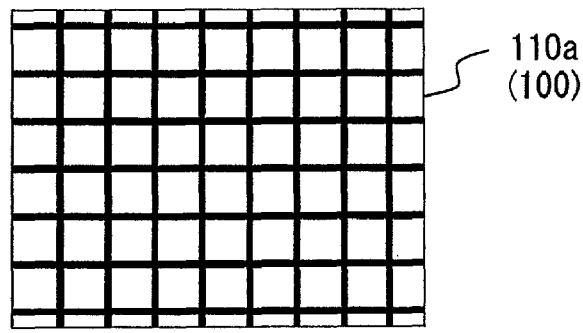
OBTAINING CURVATURE R OF PREDETERMINED GRID
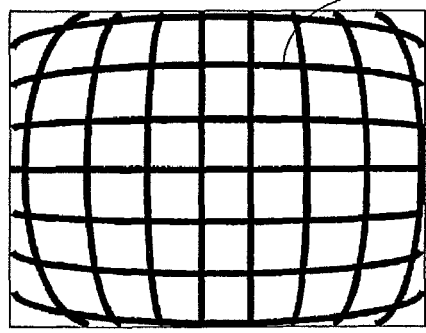
LENS DISTORTION STATE
(RADIAL)
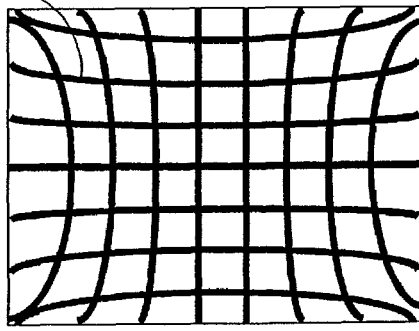
LENS DISTORTION STATE
(BOBBIN)
IDENTIFYING AS LENS DISTORTION
STATE IF R>Rth
(R: CURVATURE, Rth: THRESHOLD VALUE)
F I G. 1 4

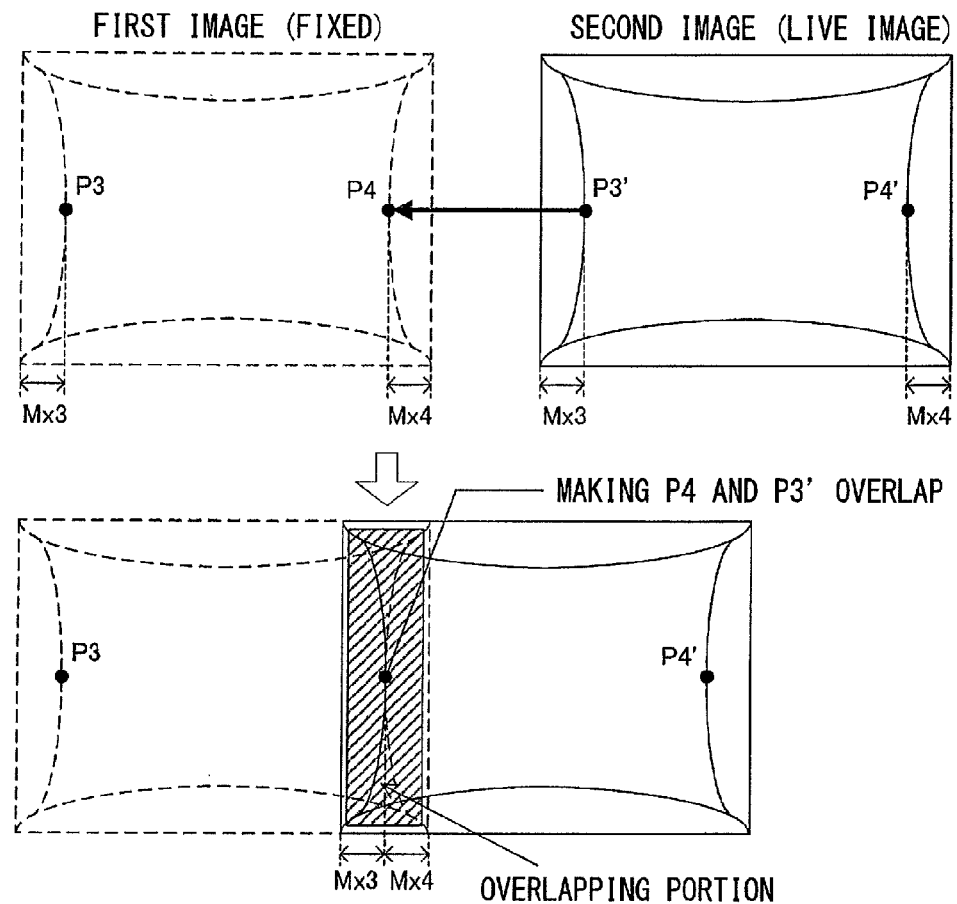
F I G. 17

MICROSCOPE SYSTEM AND METHOD OF OPERATION THEREOF

CROSS REFERENCE TO RELATED APPLICATION

This application is based on and claims the benefit of priority from prior Japanese Patent Application No. 2008-312554 filed in Japan on Dec. 8, 2008, the entire contents of which are incorporated by this reference.

BACKGROUND OF THE INVENTION

1. Field of the Invention

The present invention relates to a microscope system for obtaining an image having a wide view angle by repeatedly capturing an image while moving a stage, and by connecting obtained images having a small view angle.

2. Description of the Related Art

When a sample is observed with a microscope, the area of the sample that can be observed and shot at one time is mainly determined in accordance with the magnification of an objective lens. If the magnification of an objective lens is high, a high-definition image can be observed even if an observation area becomes narrow.

In a method mainly used for pathological diagnosis or to obtain material for a study, a sample image having a wide view angle is obtained at a low magnification. Thereafter, a portion of the image which is desired to be obtained in detail is specified, the objective lens is switched to a high magnification lens, and the image of the specified portion at a high resolution is obtained. In this case, if the view angle is narrow, still images having a small view angle are repeatedly shot while a stage is moved, and the obtained images having a small view angle are connected so as to obtain a synthesized image having a wide view angle.

A motorized microscope where a stage is electrically controlled in this way is known as a so-called virtual microscope system. However, since motorized microscopes are expensive, users who are accustomed to microscope operations tend to avoid using them. The following are techniques related to such virtual microscope systems.

Japanese Laid-open Patent Publication No. 2007-24927 discloses a technique for moving a stage in the vertical direction (X-Y) and a rotational direction (θ) with respect to an optical axis, for determining the coordinates of the position of the stage, and for synthesizing partitioned images having a small view angle.

Additionally, Japanese Laid-open Patent Publication No. 2005-266718 discloses a technique for specifying a portion desired to be observed in detail by recognizing an image shot at a low magnification as a parent image, and for recording the position of the parent image with respect to a certain child image by recognizing a partitioned image having a high magnification as the child image.

Furthermore, for image construction, there is a problem in terms of image quality wherein the seams of partitioned images shot within a small range are conspicuous in a synthesized image. As a method for improving this problem, Japanese Laid-open Patent Publication No. 2001-274973 discloses a technique for removing unevenness in brightness levels by making a lens distortion correction and a shading correction when partitioned images are obtained at a high magnification. This publication also discloses that unevenness in brightness levels is made inconspicuous after a synthesized image is generated by providing an overlapping portion between partitioned images with an optical flow method.

SUMMARY OF THE INVENTION

A microscope system according to the present invention for obtaining an image having a wide view angle by repeatedly capturing an image with an objective lens having a high magnification while moving a stage, and by connecting captured images having a small view angle includes: a stage on which a sample is placed; a stage driving unit for moving the stage at least in a vertical direction with respect to an optical axis; a stage position detecting unit for detecting the position of the stage; an image capturing unit for capturing an optical image of the sample; a position to be reached determining unit for determining a position to be reached, which is the next image capturing position of the stage and at which the image is captured, on the basis of the state of the captured image and the position of the stage; and a stage move guiding unit for prompting a user to move the stage to the position to be reached on the basis of the detected position of the stage and the determined position to be reached.

Additionally, an operation method according to the present invention of a microscope system for obtaining an image having a wide view angle by repeatedly capturing an image with an objective lens having a high magnification while moving a stage, on which a sample is placed and which can be moved at least in a vertical direction with respect to an optical axis, and by connecting captured images having a small view angle includes: detecting the position of the stage; capturing an optical image of the sample; determining a position to be reached, which is the next image capturing position of the stage, on the basis of the state of the captured image and the position of the stage, at which the image is captured; and prompting a user to move the stage to the position to be reached on the basis of the detected position of the stage and the determined position to be reached.

Furthermore, a microscope system according to the present invention for obtaining an image having a wide view angle by repeatedly capturing an image with an objective lens having a high magnification while moving a stage, and by connecting captured images having a small view angle includes: a stage on which a sample is placed; a stage driving unit for moving the stage at least in a vertical direction with respect to an optical axis; a stage position detecting unit for detecting the position of the stage; an image capturing unit for capturing an optical image of the sample; a position to be reached determining unit for determining a position to be reached, which is the next image capturing position of the stage, on the basis of the state of the captured image and the position of the stage, at which the image is captured; and an image synthesizing unit for generating a synthesized image by sequentially connecting an image captured at the position to be reached.

BRIEF DESCRIPTION OF THE DRAWINGS

FIG. 2 is a flowchart of an image synthesis process in a first embodiment;

FIG. 9 illustrates one example of a captured image where shading occurs in a fourth embodiment (implementation example 1);

FIG. 14 is an explanatory view of identifying a lens distortion state by using a grid pattern in the fourth embodiment (implementation example 2);

FIG. 17 illustrates an overlap process executed when a distortion characteristic of a lens is identified as a radial lens distortion state in the fourth embodiment (implementation example 2).

DESCRIPTION OF THE PREFERRED EMBODIMENTS

Figure 1:
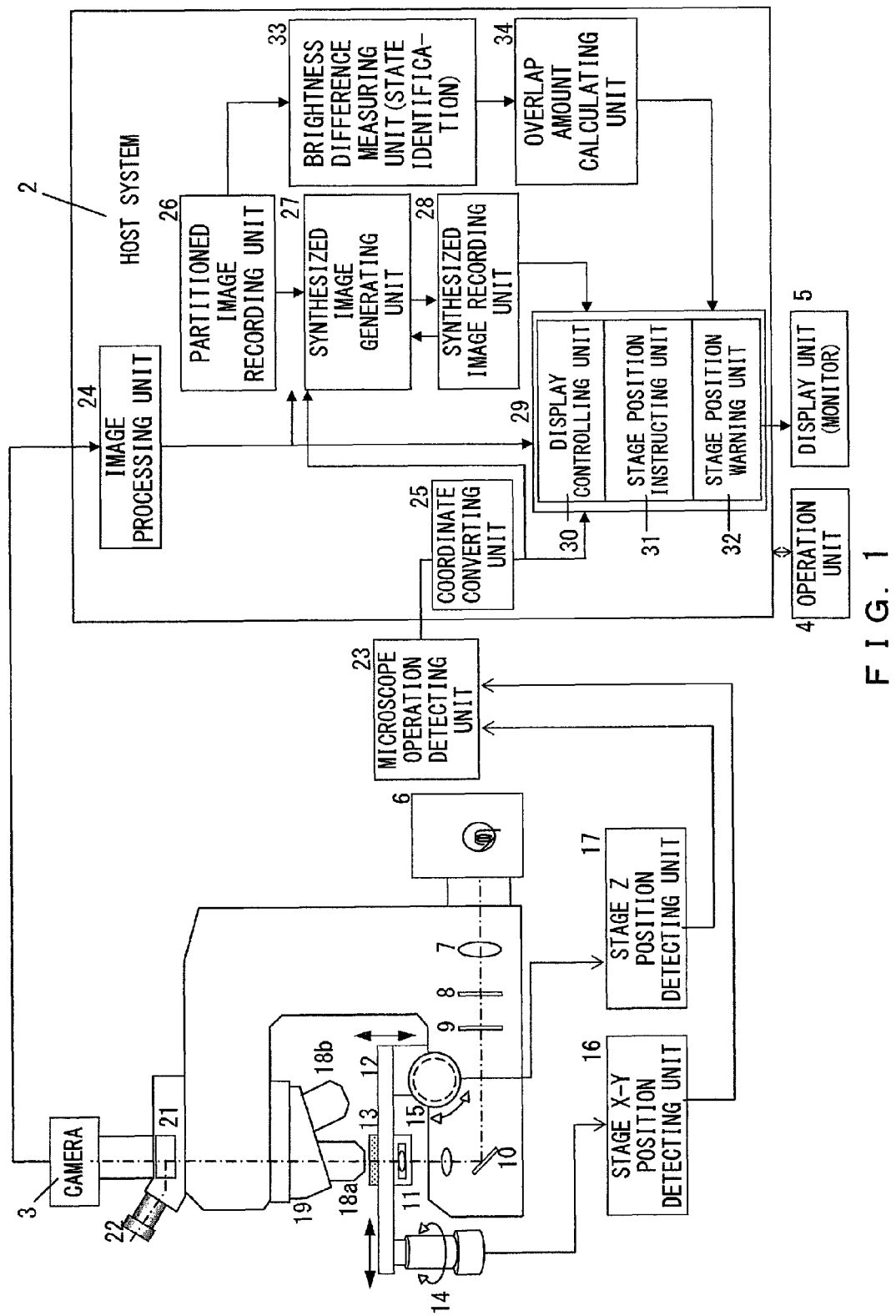
FIG. 1 illustrates a configuration of a microscope system common to embodiments according to the present invention.

In a virtual microscope system configured with a manual microscope where a stage is manually moved, it is difficult to adjust the position of the stage with high precision. In addition, if the moving direction of the stage or the amount of moving is erroneous, an operational mistake in which an interval between partitioned images becomes wider and is not easily narrowed again can possibly occur.

There is also a problem in which the amount of processing time required from the time at which partitioned images are obtained to the time at which a synthesized image is generated with lens distortion correction and shading correction processes increases. Moreover, if the amount of overlap between partitioned images is insufficient even though lens distortion correction and the shading correction are made, brightness unevenness occurs in a synthesized image. If the amount of overlap is large at this time, the view angle of the synthesized image becomes narrow.

In light of the above described problems, an embodiment according to the present invention provides a microscope system that can obtain an image having a wide view angle by repeatedly capturing an image while manually moving a stage, and by connecting images having a small view angle without making a user aware of the adjustment of the position of the stage.

According to this embodiment, a high-definition microscope digital image having a wide view angle can be obtained via simple operations in a microscope system composed of a microscope image shooting apparatus for shooting a microscope image having a sample, and a microscope apparatus where the position of a stage can be manually moved.

The microscope system according to this embodiment of the present invention obtains an image having a wide view angle by repeatedly capturing an image with an objective lens having a high magnification while moving a stage, and by connecting captured images having a small view angle.

The microscope system includes the stage, a stage driving unit, a stage position detecting unit, an image capturing unit, a position to be reached determining unit, and a stage move guiding unit.

A sample is placed on the stage. The stage corresponds to, for example, a stage 12 in this embodiment.

The stage driving unit moves the stage at least in a vertical direction with respect to an optical axis. The stage driving unit corresponds to, for example, a stage X-Y direction moving handle 14 (or may further include a stage Z direction moving handle 15) in this embodiment.

The stage position detecting unit detects the position of the stage. The stage position detecting unit corresponds to, for example, a stage X-Y position detecting unit 16 (or may further include a stage Z position detecting unit 17) in this embodiment.

The image capturing unit captures an optical image of the sample. The image capturing unit corresponds to, for example, a camera 3 in this embodiment.

The position to be reached determining unit determines a position to be reached, which is the next image capturing position of the stage and at which the image is captured, on the basis of the state of the captured image and the position of the stage. The position to be reached determining unit corresponds to, for example, a brightness difference measuring unit 33 and an overlap amount calculating unit 34 in this embodiment.

The stage move guiding unit prompts a user to move the stage to the position to be reached on the basis of the detected position of the stage and the determined position to be reached. The stage move guiding unit corresponds to, for example, a stage position instructing unit 31 in this embodiment.

By configuring the microscope system in this way, a seamless image having a wide view angle and in which seams are not conspicuous can be obtained only by repeatedly capturing an image while manually moving the stage in accordance with the guidance of the moving of the stage without making a user aware of the adjustment of the position of the stage.

The microscope system may further include a warning unit. The warning unit issues a warning when the stage is moved away from the position to be reached. The warning unit corresponds to, for example, a stage position warning unit 32 in this embodiment. By configuring the microscope system in this way, a user is prevented from moving the stage erroneously.

Additionally, the position to be reached determining unit may further include a brightness difference measuring unit and an overlap amount determining unit as another embodiment of the present invention.

The brightness difference measuring unit measures a brightness difference between the brightness of a predetermined pixel and that of an arbitrary pixel other than the predetermined pixel within an image. More specifically, the brightness difference measuring unit measures a brightness difference between the brightness of a pixel at the central position and that of a pixel in a side portion within the image. The brightness difference measuring unit corresponds to, for example, a brightness difference measuring unit 33 in this embodiment.

The overlap amount determining unit determines, in accordance with the brightness difference, the amount of overlap in corresponding side portions of a first image that is captured at the current image capturing position and a second image that is an image to be captured next and that is the image in a preset scanning direction. Moreover, the overlap amount determining unit determines the position to be reached, at which the second image is captured, to be a position that is further inward than the side portion in the scanning direction of the first image by the amount of overlap. The overlap amount determining unit corresponds to, for example, an overlap amount calculating unit 34 in this embodiment.

By configuring the microscope system in this way, the amount of overlap can be adjusted in accordance with the brightness difference between the brightness of a pixel in the vicinity of the center of an image and that of a peripheral pixel. Accordingly, an overlapping position more suitable for an image connection can be obtained when images to be connected are made to overlap.

Additionally, the position to be reached determining unit may further include a lens characteristic identifying unit and an overlap amount determining unit as another embodiment of the present invention.

The lens characteristic identifying unit measures a brightness difference between the brightness of a predetermined pixel within an image and that of each pixel other than the predetermined pixel, and identifies the lens characteristic of an objective lens on the basis of the shape of a line linking pixels adjacent to a pixel having a brightness difference which does not exceed a threshold value from among pixels having a brightness difference exceeding the threshold value. The lens characteristic identifying unit corresponds to, for example, a brightness difference measuring unit 33 in this embodiment.

The overlap amount determining unit determines, in accordance with the identified lens characteristic, the amount of overlap of corresponding side portions of the first image that is captured at the current image capturing position and the second image that is an image to be captured next and that is the image in a preset scanning direction. Then, the overlap amount determining unit determines the position to be reached, at which the second image is captured, to be a position that is further inward than the side portion in the scanning direction side of the first image by the amount of overlap. The overlap amount determining unit corresponds to, for example, an overlap amount calculating unit 34 in this embodiment.

The lens characteristic identifying unit identifies the lens characteristic as a shading state if a line which links pixels adjacent to a pixel having a brightness difference that does not exceed the threshold value from among the pixels having a brightness difference exceeding the threshold value forms a curve in the shape of a nearly concentric arc.

If the lens characteristic is identified as the shading state, the overlap amount determining unit makes pixel positions at which a side portion in the same direction as the scanning direction of the two images intersects with the line overlap in the corresponding side portions when the first image and the second image are connected. As a result, the overlap amount determining unit determines the amount of overlap on the basis of the overlapping image portion.

By configuring the microscope system in this way, the lens characteristic of an objective lens is identified on the basis of the shape of the line linking pixels adjacent to a pixel having a brightness difference, which does not exceed a threshold value, among pixels having a brightness difference, which exceeds the threshold value, between the brightness of a pixel in the vicinity of the center of an image and that of a peripheral pixel. The amount of overlap can be determined in accordance with the identified lens characteristic.

Additionally, a sample in a grid pattern may be available as the sample as another embodiment of the present invention. In this case, the position to be reached determining unit may further include a lens characteristic identifying unit and an overlap amount determining unit.

The lens characteristic identifying unit identifies the lens distortion state of the objective lens by identifying a curve having a minimum curvature among lines which configure the grid pattern within the image and the curvature of which exceeds a threshold value. The lens characteristic identifying unit corresponds to, for example, a brightness difference measuring unit 33 in this embodiment.

The overlap amount determining unit determines, in accordance with the identified lens distortion state, the amount of overlap in corresponding side portions of the first image that is captured at the current image capturing position and the second image that is an image to be captured next and that is the image in a preset scanning direction. Then, the overlap amount determining unit determines the position to be reached, which is a position at which the second image is captured, to be a position further inward by the amount of overlap than the side portion in the scanning direction of the first image. The overlap amount determining unit corresponds to, for example, an overlap amount calculating unit 34 in this embodiment.

If the lens characteristic identifying unit identifies that the curve is a curve bending from the top, the bottom, the right, and the left of the view angle towards the inside, the overlap amount determining unit makes pixel positions which correspond to the peak portion of the curve of the two images overlap in corresponding side portions when the first image and the second image are connected. The overlap amount determining unit determines the amount of overlap on the basis of the resultant overlapping image portion.

If the lens characteristic identifying unit identifies that the curve is a curve bending from the top, the bottom, the right, and the left of the view angle towards the outside, the overlap determining unit makes pixel positions at which the side portion in the same direction as the scanning direction of the two images intersects with the line overlap in the corresponding side portions when the first image and the second image are connected. As a result, the overlap amount determining unit determines the amount of overlap on the basis of the overlapping image portion.

By configuring the microscope system in this way, the state of the lens distortion can be identified on the basis of the shape of the grid pattern, and the amount of overlap can be determined in accordance with the identified state of the lens distortion.

The microscope system further includes an image synthesizing unit. The image synthesizing unit generates a synthesized image by sequentially connecting an image captured at the position to be reached. More specifically, the image synthesizing unit generates a synthesized image by deleting the overlapping portion respectively from the first image and the second image, and by connecting the images. The image synthesizing unit corresponds to, for example, a synthesized image generating unit 27 in this embodiment.

By configuring the microscope system in this way, an evenly synthesized image without seams can be generated.

Embodiments according to the present invention are described below with reference to the drawings.

FIG. 1 illustrates a configuration of a microscope system common to the embodiments according to the present invention. In this embodiment, a microscope of a transmission observation optics system is used as one example of a microscope body 1. As the transmission observation optics system, an illumination light source 6, a collector lens 7, an attenuation filter 8, a field stop 9, a reflecting mirror 10, and an aperture stop 11 are provided. The collector lens 7 collects illumination light of the illumination light source 6.

On an observation optical path where an optical path of the transmission observation optics system is collected, a sample 13 and a stage 12 are arranged. The stage 12 supports the sample 13, and can move in the vertical and the horizontal directions with respect to the optical axis. The stage 12 is provided with a stage X-Y direction moving handle 14, a stage X-Y position detecting unit 16, a stage Z direction moving handle 15, and a stage Z position detecting unit 17. With the stage 12, the coordinates of the sample 13 can be detected.

The stage X-Y direction moving handle 14 moves the stage 12 in the vertical direction (X-Y direction) with respect to the optical axis. The stage X-Y position detecting unit 16 detects the position of the origin of the stage X-Y direction moving handle 14 and the amount of change from the position of the origin. The stage Z direction moving handle 15 moves the stage 12 in the optical axis (Z direction). The stage Z position detecting unit 17 detects the position of the origin of the stage Z axis direction moving handle 15, and the amount of change from the position of the origin. Here, a rotary encoder or the like is used as the stage X-Y position detecting unit 16 and the stage Z position detecting unit 17.

Additionally, on the observation optical path, a revolver 19 and a beam splitter 21 are provided. By rotating the revolver 19, any of a plurality of installed objective lenses 18a, 18b, . . . (generically referred to as objective lenses 18 hereinafter depending on need) is selected for an observation. The beam splitter 21 splits the observation optical path lens 22 side and a camera 3 side.

The stage X-Y position detecting unit 16 and the stage Z position detecting unit 17 are connected to a microscope operation detecting unit 23. Via the microscope operation detecting unit 23, the stage X-Y position detecting unit 16 and the stage Z position detecting unit 17 integrate the information about the objective lens 18 and the position of the stage, and transmit the integrated information to the host system 2.

The host system 2 includes an image processing unit 24, a partitioned image recording unit 26, a synthesized image generating unit 27, a synthesized image recording unit 28, a coordinate converting unit 25, a display controlling unit 30, a stage position instructing unit 31, and a stage position warning unit 32.

The image processing unit 24 executes image processes such as white balance, gray level correction, etc. The partitioned image recording unit 26 records a shot image and its coordinates. The synthesized image generating unit 27 synthesizes a plurality of images stored in the partitioned image recording unit 26. The synthesized image recording unit 28 records a synthesized image. The coordinate converting unit 25 generates coordinate information on the basis of the type of objective lens (lens magnification) and the information about the position of the stage, which are provided from the microscope operation detecting unit 23.

The display controlling unit 30 determines a display position on the basis of the coordinate information output from the coordinate converting unit 25 and an image output from the image processing unit 24. The stage position instructing unit 31 instructs the stage moving direction by making the display unit 5 display the stage moving direction. The stage position warning unit 32 makes the display unit 5 display a warning when the stage is moved in a direction different from the stage moving direction instructed by the stage position instructing unit 31. The display controlling unit 30, the stage position instructing unit 31, and the stage position warning unit 32 are collectively referred to as an instruction/display controlling unit 29.

The host system 2 also includes a brightness difference measuring unit 33 and an overlap amount calculating unit 34. The brightness difference measuring unit 33 measures a difference between brightness values from an image stored in the partitioned image recording unit 26. The overlap amount calculating unit 34 calculates the amount of overlap between images on the basis of the brightness difference measured by the brightness difference measuring unit 33. The amount of overlap calculated by the overlap amount calculating unit 34 is output to the stage position instructing unit 31.

To the host system 2, the display unit 5 and the operation unit 4 are connected. The display unit 4 displays an image and its position relationship. The operation unit 4 corresponds to a keyboard or a mouse of a personal computer. The embodiments according to the present invention are described below.

FIRST EMBODIMENT

This embodiment refers to a microscope system that enables a user to easily capture an image having a small view angle by guiding the user to move the stage to a position to be reached with a user operation when images are connected in a manual microscope.

Figure 3:
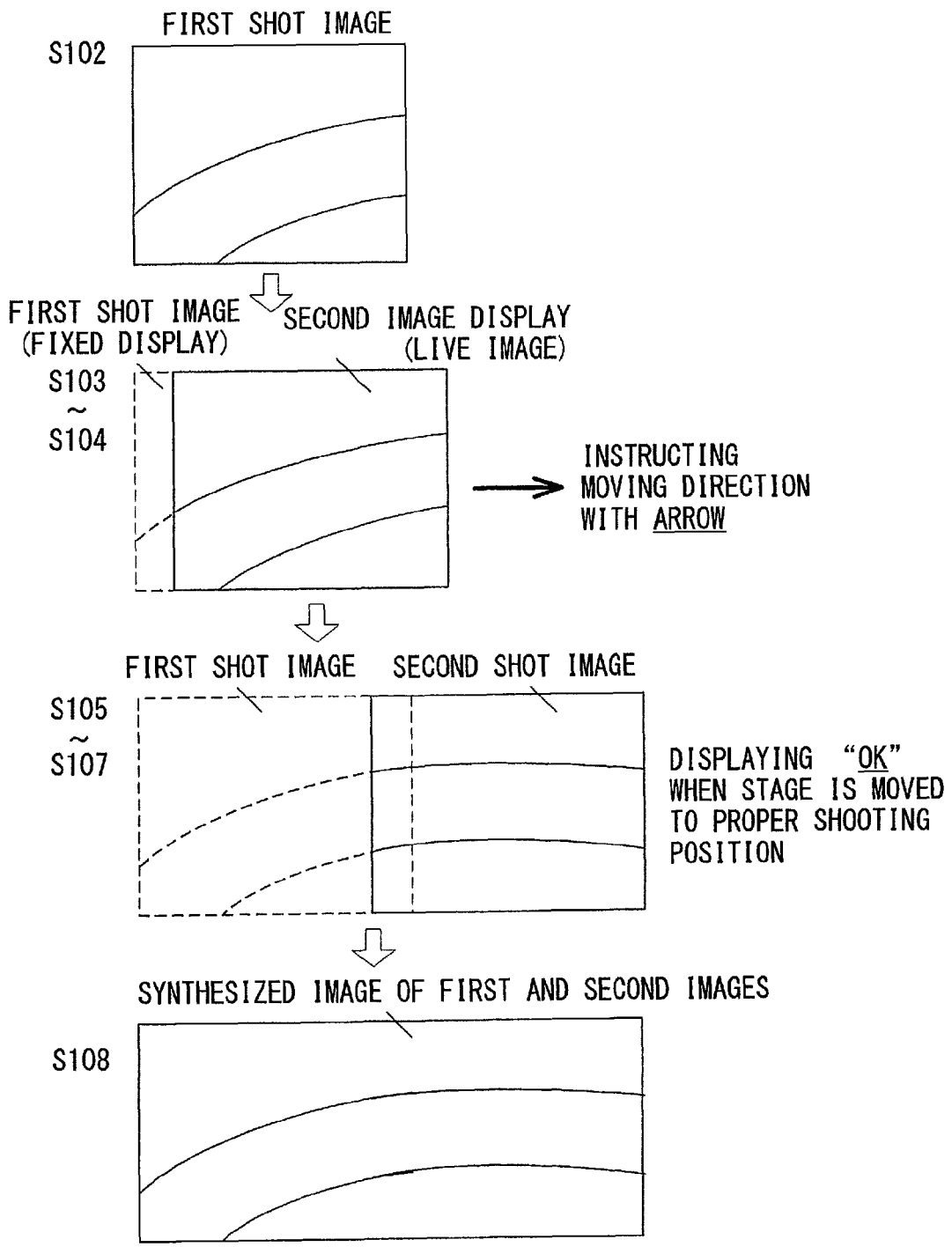
FIG. 3 illustrates an example of the image synthesis process corresponding to the flow of FIG. 2.

FIG. 2 is a flowchart of an image synthesis process in this embodiment. FIG. 3 illustrates an example of the image synthesis process corresponding to the flow of FIG. 2. FIG. 2 is described below with reference to FIG. 3.

An objective lens 18 of a high magnification is set by adjusting the revolver 19. Moreover, the scanning direction of an image synthesis (the moving direction of the stage) is set by operating the operation unit 4 on a setting screen displayed on the display unit 5 (S101). Then, the image synthesis process is started.

An optical image of the sample 13 placed on the stage 12 is captured with the camera 3. The image is image-processed by the image processing unit 24 and displayed on the display unit 5. The display area of the sample image displayed on the display unit 5 is aligned with an image capturing start position by operating the stage X-Y moving handle 14. Then, the sample image is aligned with a focusing position by operating the stage Z axis moving handle 15. Then, the sample image is shot with the camera 3 (S102).

The shot image (first image) is transmitted from the camera 3 to the image processing unit 24, which then executes the image processes for the image. Moreover, the information about the image capturing position of the stage 12 at the time of the image capturing is detected by the stage X-Y position detecting unit 16 and the stage Z position detecting unit 17, and transmitted to the coordinate converting unit 25 via the microscope operation detecting unit 23. The coordinate converting unit 25 converts the position information into coordinate information.

The shot image (first image) and the coordinate information detected at that time are temporarily stored in the partitioned image recording unit 26, and transmitted and recorded to the synthesized image recording unit 28 via the synthesized image generating unit 27. The display controlling unit 30 makes the display unit 5 fixedly display the first image recorded to the synthesized image recording unit 28. Here, the fixed display indicates that a still image is displayed fixedly in one display area even if the stage 12 is moved.

Next, the display controlling unit 30 overlays and displays a live image (second image) on the fixedly displayed first image (S103). If the observation position of the sample is moved by moving the stage, an image at the changed observation position is displayed in real time as the second image (live image). In the meantime, the first image (still image) continues to be displayed on the back of the second image (live image).

Then, the stage position instructing unit 31 instructs the display unit 5 to display the stage moving direction, which is toward the position to be reached, with an arrow in a predetermined display area of the display unit 5 in order to guide a user to move the stage 12 to the proper shooting position (position to be reached) in the state where the live image (second image) is displayed on the display unit 5 (S104).

The user moves the stage 12 by operating the stage X-Y moving handle 14 in accordance with the orientation of the displayed arrow. If the stage 12 is moved in a direction different from the instructed moving direction, the stage position warning unit 32 makes the display unit 5 display a warning message (S105).

The stage position instructing unit 31 continues to guide the user with the arrow until the stage 12 is moved to the proper shooting position (position to be reached) ("NO" in S106).

When the stage 12 reaches the position to be reached ("YES" in S106), the stage position instructing unit 31 makes the display unit 5 display "OK". The user stops the moving of the stage 12 by stopping the operation of the stage X-Y moving handle 14 at the stage position for which "OK" is displayed.

Thereafter, a still image is shot at the stopped stage position (S107). The still image (second image) shot at the stage position is transmitted from the camera 3 to the image processing unit 24, which then executes the image processes for the image. Moreover, the information about the image capturing position of the stage 12 at the time of the image capturing is transmitted from the stage X-Y position detecting unit 16 and the stage Z position detecting unit 17 to the coordinate converting unit 25 via the microscope operation detecting unit 23. The coordinate converting unit 25 converts the position information into coordinate information. The shot still image (second image) and its coordinate information are stored in the partitioned image recording unit 26.

Next, the synthesized image generating unit 27 reads the second image and the coordinate information corresponding thereto, which are stored in the partitioned image recording unit 26, and the first image and the coordinate information corresponding thereto, which are stored in the synthesized image recording unit 28 in S102. The synthesized image generating unit 27 connects the second image to the first image (synthesizes the images) in accordance with the coordinates of the first and the second images (S108). The synthesized image generating unit 27 records the synthesized image to the synthesized image recording unit 28 as the first image. Then, the display controlling unit 30 makes the display unit 5 fixedly display the synthesized first image.

This series of operations and processes (S103 to S108) is repeated until synthesized images are generated for all the areas or for an entire target area of the sample (S109).

In this embodiment, the stage position instructing unit 31 and the stage position warning unit 32 make the display unit 5 display a moving direction and a warning, respectively. However, the moving direction and the warning are not limited to the display. They may be output by voice.

According to this embodiment, a seamlessly synthesized image where seams are not conspicuous can be created only by moving the stage in a stage moving direction instructed by the guidance of the system, and by shooting images when the images are connected in a manual microscope. Accordingly, a user does not need to move the stage and shoot images in consideration of connection positions, whereby a burden on the operations of the user can be reduced. Moreover, if the stage is moved in a different direction, a warning is displayed. This prevents the user from moving the stage erroneously.

SECOND EMBODIMENT

This embodiment refers to a microscope system where the amount of overlap is adjusted in accordance with a brightness difference ($\Delta I$) between the brightness of a pixel in the vicinity of the center of an image and the brightness of a peripheral pixel at a peripheral position of the image.

Figure 4:
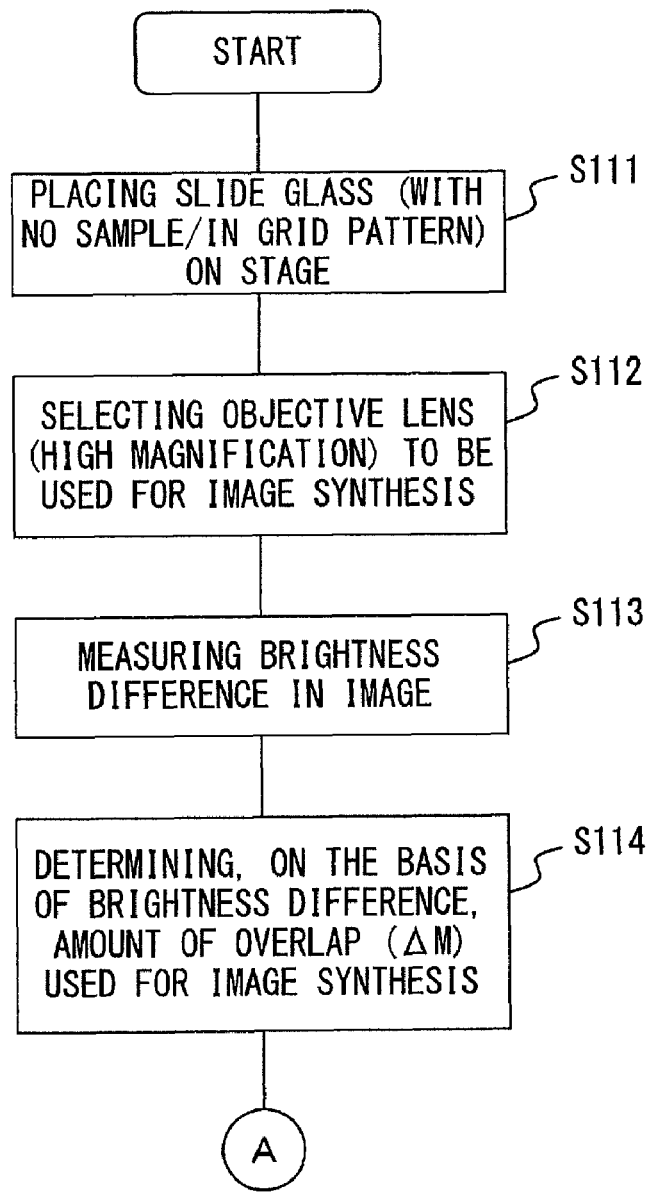
FIG. 4 is a flowchart of a process for deriving the amount of overlap between partitioned images by measuring the characteristics of a microscope optics system and an objective lens in a second embodiment.
Figure 5:
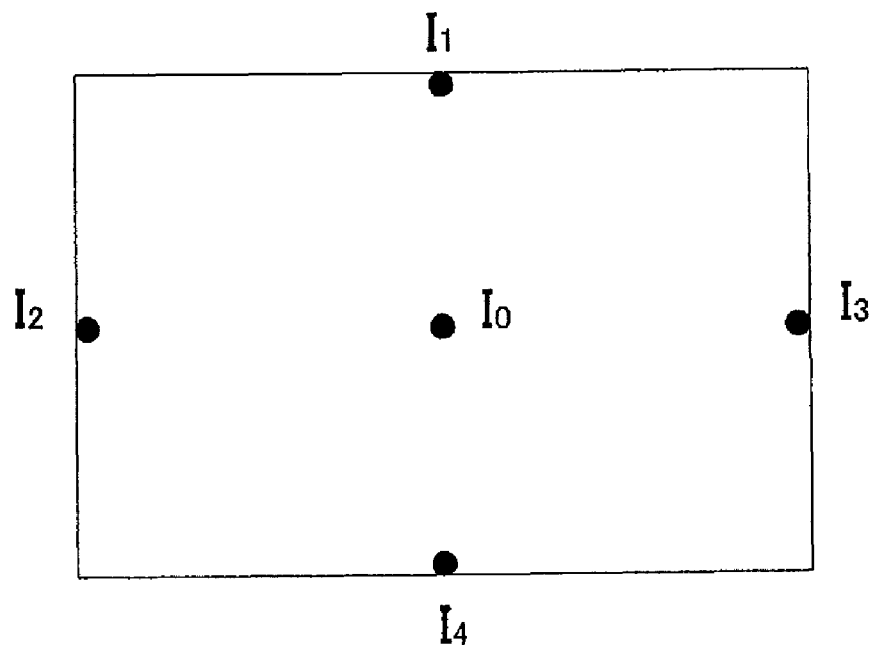
FIG. 5 illustrates brightness difference measurement points within an image in the second embodiment.

FIG. 4 is a flowchart of a process for deriving the amount of overlap between partitioned images by measuring the characteristics of the microscope optics system and the objective lens 18 in this embodiment. FIG. 5 illustrates brightness difference measurement points within an image in this embodiment. The flow of FIG. 4 is described with reference to FIG. 5.

Initially, a user puts a slide glass on which no sample is placed at a position on the stage 12 which intersects with the observation optical path (S111). Then, the user selects an objective lens 18 of a high magnification to be used for an image synthesis (S112). At this time, S101 to S103 of FIG. 2 are executed. Next, an image read from the partitioned image recording unit 26 is input to the brightness difference measuring unit 33. The brightness difference measuring unit 33 measures the brightness of a pixel at the central position of a view angle within the image and that of each pixel at an arbitrarily peripheral position (four peripheral points illustrated in FIG. 5), and measures a difference between the brightness ($I_0$) of the pixel at the central position and those of the pixels at the peripheral positions ($I_1$ to $I_4$) (S113). Namely, the brightness differences at the four positions $\Delta I_1 = |I_0 - I_1|$, $\Delta I_2 = |I_0 - I_2|$, $\Delta I_3 = |I_0 - I_3|$, and $\Delta I_4 = |I_0 - I_4|$ are derived.

The overlap amount calculating unit 34 determines the amount of overlap ($\Delta M$) between images to be connected when the images are synthesized on the basis of the brightness differences measured by the brightness difference measuring unit 33 (S114). The process of S114 will be described in detail later with reference to FIGS. 6A and 6B.

Figures 6A, 6B:
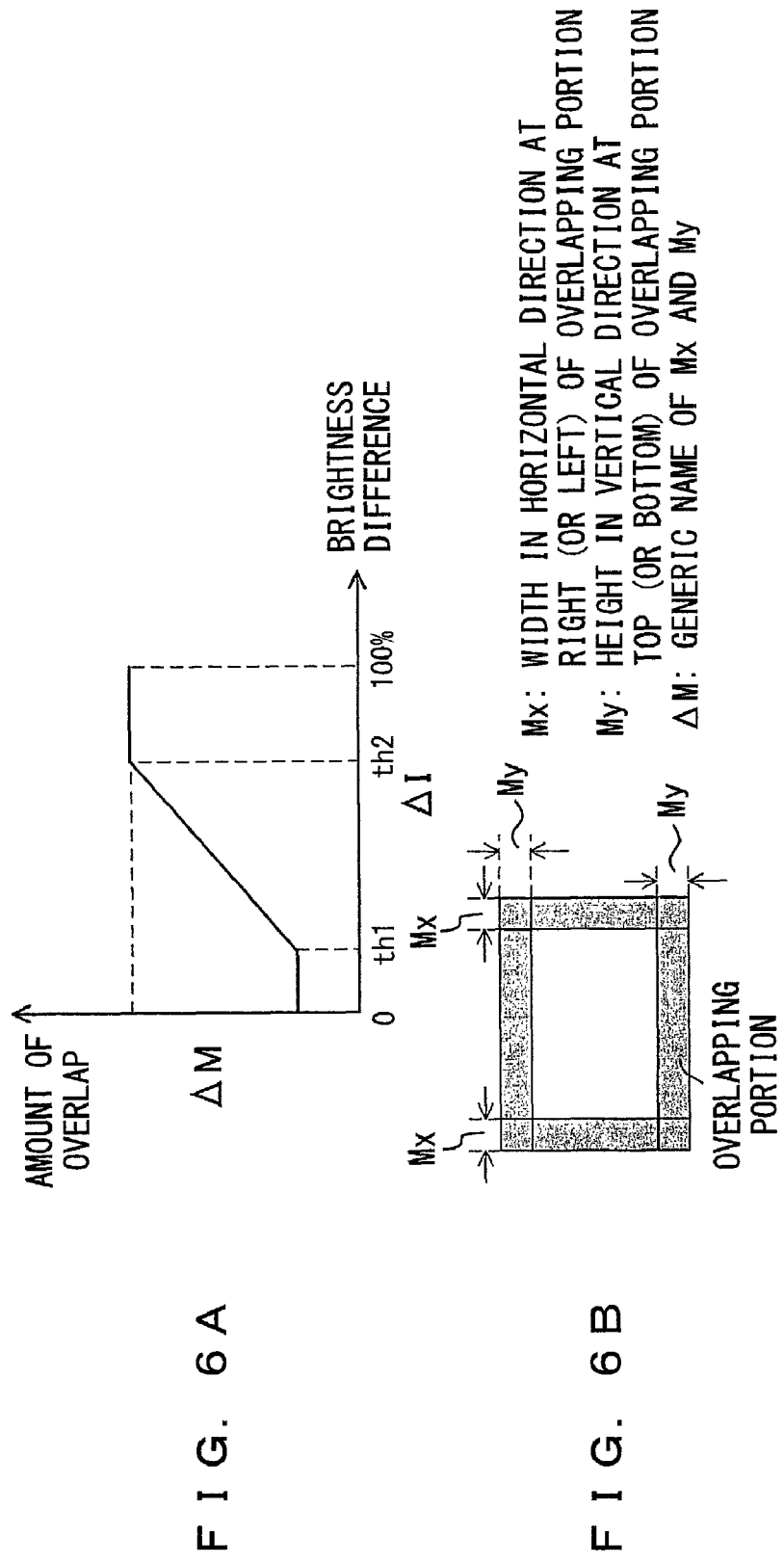
FIGS. 6A and 6B illustrate a relationship between a difference (ΔI) between the brightness of a pixel in the vicinity of the center and that of a peripheral pixel, and the amount of overlap (ΔM) of partitioned images (the amount of overlap indicates a distance from one end of a partitioned image) in the second embodiment.

FIGS. 6A and 6B illustrate a relationship between the difference ($\Delta I$) between the brightness of a pixel in the vicinity of the center and that of a pixel at a peripheral position, and the amount of overlap ($\Delta M$) of partitioned images (the amount of overlap indicates a distance from one end of a partitioned image) in this embodiment.

As illustrated in FIG. 6B, the amount of overlap (ΔM) is classified into Mx, which is a width in the horizontal direction of an overlapping portion on the right or the left side of one partitioned image, and My, which is a height in the vertical direction of the overlapping portion on the top or the bottom side of the one partitioned image.

In FIG. 6A, "th1" represents a threshold value of a brightness difference which does not affect fluctuations in an overlapping portion. "th2" represents a threshold value of a brightness difference which disables an evenly synthesized image to be obtained by overlapping. A largeness/smallness relationship is 0%<th1<th2<100%. If the widths from the left and the right ends are different in the amount of overlap (Mx), a broader width is selected.

The overlap amount calculating unit 34 determines the amount of overlap on the basis of the brightness difference obtained by the brightness difference measuring unit 33 on the basis of the graph of the correspondence relationship illustrated in FIG. 6A. Namely, values that do not empirically cause the brightness unevenness of a synthesized image in the relationship between a brightness difference and an image synthesis are put into a database and stored as the graph of the correspondence relationship of FIG. 6A in the host system 2, although this is not illustrated. The overlap amount calculating unit 34 determines the amount of overlap (ΔM, namely Mx, My) which corresponds to the calculated brightness difference ΔI, by referencing this database. The overlap amount calculating unit 34 stores the determined amount of overlapping (Mx, My) in a predetermined storage device within the host system 2.

The calculated brightness difference is included as an arbitrary point within a range from th1 to th2. If the brightness difference is beyond the range from th1 to th2, an image synthesis may be aborted. Alternatively, the brightness of another pixel may be obtained and recalculated as a peripheral brightness value ($I_1$ to $I_4$).

According to this embodiment, the amount of overlap can be adjusted in accordance with the brightness difference (ΔI) between the brightness of a pixel in the vicinity of the center within an image and that of a pixel at a peripheral position of the image. Therefore, an overlap position more suitable for an image connection can be obtained when images to be connected are made to overlap. Moreover, the amount of overlap is determined on the basis of the brightness difference, whereby an evenly synthesized image can be generated without making seams appear between images to be connected.

Note that the second embodiment and the first embodiment may be combined. In this case, the second embodiment is executed in S104 of FIG. 2. The overlap amount calculating unit 34 determines a position to be reached on the basis of the amount of overlap resulting from executing S104 of FIG. 2. The stage position instructing unit 31 guides the user to move the stage to the position to be reached.

THIRD EMBODIMENT

This embodiment refers to a microscope system where the position to be reached of the moving of the stage is determined on the basis of the amount of overlap determined in the second embodiment.

Figure 7:
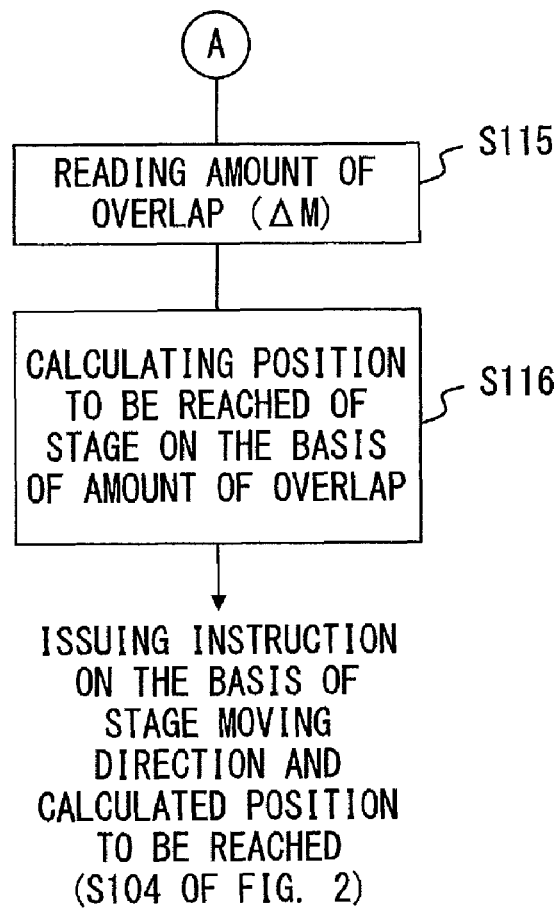
FIG. 7 is a flowchart of a process for determining a position to be reached, to which a stage is moved, on the basis of the amount of overlap in a third embodiment.

FIG. 7 is a flowchart of a process for determining the position to be reached of the moving of the stage on the basis of the amount of overlap in this embodiment. The overlap amount calculating unit 34 reads the amount of overlapping (Mx, My) that is obtained and stored by the overlap amount calculating unit 34 in the second embodiment (S115).

The overlap amount calculating unit 34 determines the position to be reached in the moving of the stage, at which a partitioned image is to be obtained, on the basis of the amount of overlap (S116). The process of S116 will be described in detail with reference to FIGS. 8A and 8B.

The stage position instructing unit 31 instructs the display unit 5 to display the arrow for prompting a user to move the stage to the determined position to be reached of the stage as described in the first embodiment on the basis of the position to be reached determined by the overlap amount calculating unit 34 (S104 of FIG. 2). Subsequent steps are similar to those of the flow illustrated in FIG. 2.

Figure 8:
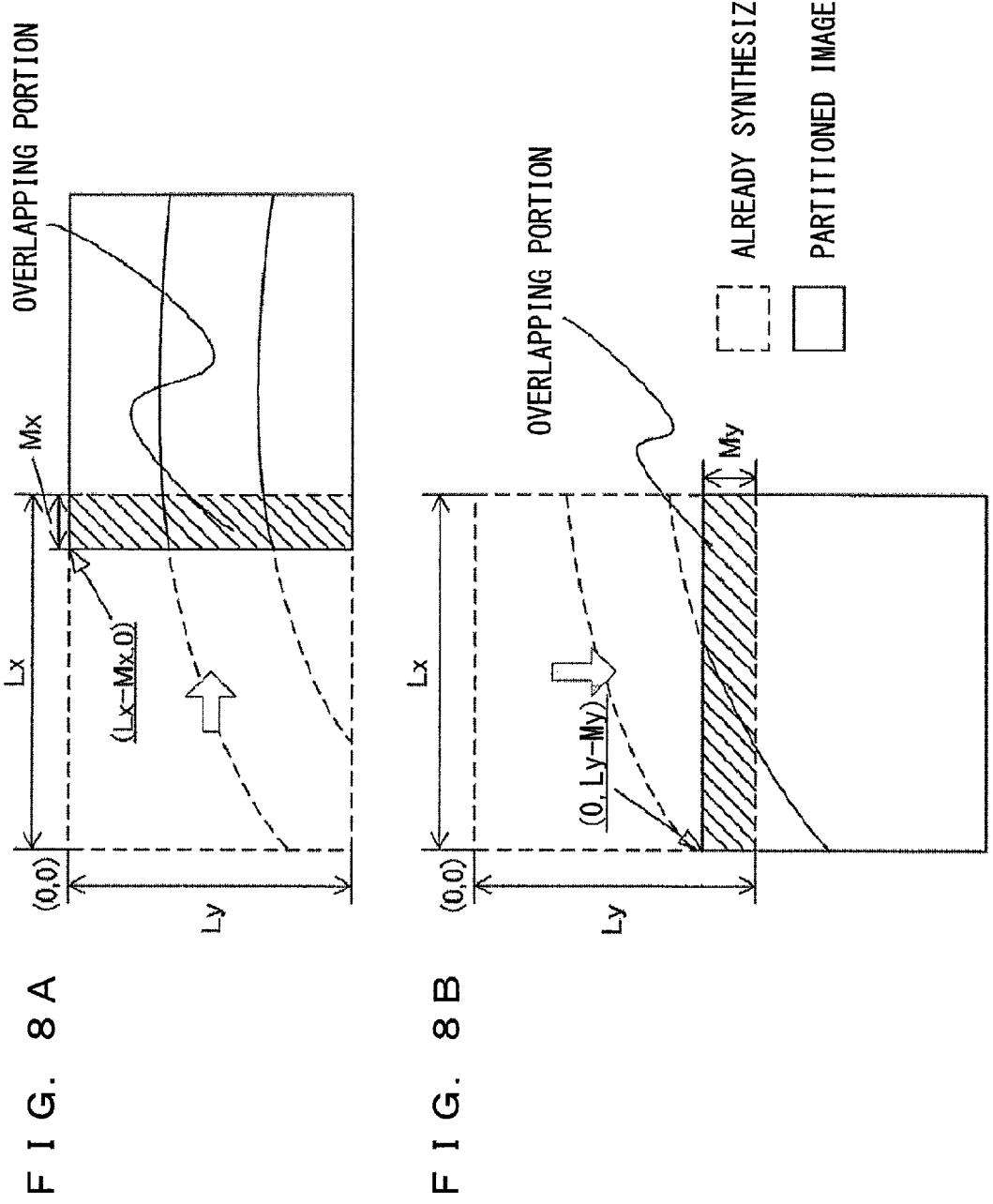
FIGS. 8A and 8B are schematics illustrating a position to be reached as an image capturing position of the next partitioned image, to which the stage is moved, on the basis of an already synthesized image in the third embodiment.

FIGS. 8A and 8B are schematics illustrating a position to be reached as an image capturing position of the next partitioned image, to which the stage is moved, on the basis of an already synthesized image in this embodiment. Lx represents a width in the horizontal direction of the synthesized image, whereas Ly represents a height in the vertical direction of the synthesized image.

In FIGS. 8A and 8B, the upper left corner point of the obtained synthesized image is assumed to be the origin (0, 0). If the position of the stage is moved to the right side with respect to the synthesized image (FIG. 8A), the overlap amount calculating unit 34 determines the position of the upper left corner point (Lx-Mx, 0) of a partitioned image to be obtained next as a position to be reached. In this case, the stage position instructing unit 31 guides the user to move the stage by displaying an arrow in the direction of moving the stage to the position to be reached (Lx-Mx, 0).

Additionally, if the position of the stage is moved downward with respect to the already synthesized image (FIG. 8B), the overlap amount calculating unit 34 determines, as a position to be reached, the coordinates of the left end corner point (0, Ly-My) to be obtained next as a position to be reached. In this case, the stage position instructing unit 31 guides the user to move the stage by displaying the arrow in the direction the stage needs to be moved to reach the position to be reached (0, Ly-My).

According to this embodiment, an overlapping position more suitable for an image connection can be obtained on the basis of the amount of overlap in the second embodiment when images to be connected are made to overlap. Moreover, an evenly synthesized image can be generated without making seams appear between connected images.

FOURTH EMBODIMENT

This embodiment refers to a microscope system where the amount of overlap is determined in accordance with the lens characteristic of an objective lens.

IMPLEMENTATION EXAMPLE 1

FIG. 9 illustrates an example of a captured image where shading occurs in this embodiment (implementation example 1). The state of brightness unevenness, in which peripheral portions of an image become darker than the central portion as illustrated in FIG. 9, is called shading.

Figure 10:
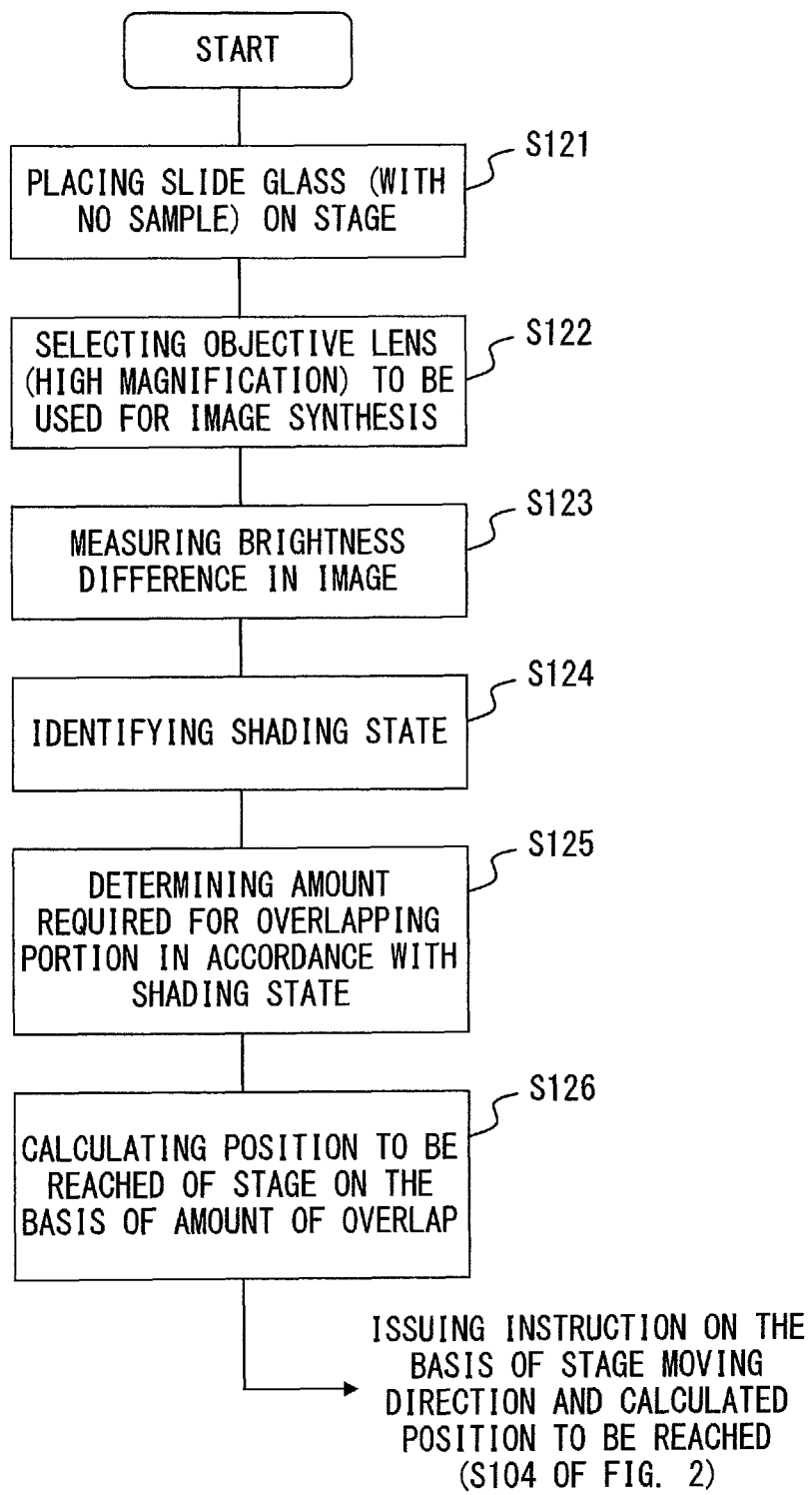
FIG. 10 is a flowchart of a process for determining the amount of overlap when captured images in a shading state are made to overlap in the fourth embodiment (implementation example 1)

FIG. 10 is a flowchart of a process for determining the amount of overlap when captured images in the shading state are made to overlap in this embodiment (implementation example 1). Initially, a user puts a slide glass on which no sample is placed at a position on the stage 12 which intersects with the observation optical path (S121). Then, the user selects an objective lens 18 of a high magnification to be used for an image synthesis (S122). At this time, S101 to S103 of FIG. 2 are executed.

Next, the brightness difference measuring unit 33 measures a brightness difference $\Delta I_i=|I_0-I_i|$ between the brightness of a pixel at the central position and those of all peripheral pixels from a shot image recorded to the partitioned image recording unit 26 (S123). Here, i=1 to n, and represents all pixels other than the central one.

The brightness difference measuring unit 33 judges whether or not the brightness difference $\Delta I_i$ exceeds the threshold value th1 (the threshold value of a brightness difference which does not affect fluctuations in an overlapping portion) of FIG. 6A. As a result, the brightness difference measuring unit 33 identifies a pixel position i at which $\Delta I_i > $th1.

If a line linking pixels adjacent to a pixel having a brightness difference which does not exceed a threshold value from among pixels having a brightness difference $\Delta I_i$ exceeding the threshold value th1 forms a concentric circle in the image as illustrated in FIG. 9, the brightness difference measuring unit 33 identifies the state as the shading state (S124).

The overlap amount calculating unit 34 determines the amount of overlap in accordance with the shading state identified in S124 (S125). The overlap amount calculating unit 34 calculates the position to be reached of the stage on the basis of the amount of overlap determined in S125 (S126). The processes of S125 and S126 will be described later.

The stage position instructing unit 31 instructs the display unit 5 to display the arrow for prompting a user to move the stage to the determined position to be reached of the stage as described in the first embodiment on the basis of the position to be reached determined by the overlap amount calculating unit 34 (S104 of FIG. 2). Subsequent steps are similar to those of the flow illustrated in FIG. 2.

Figure 11:
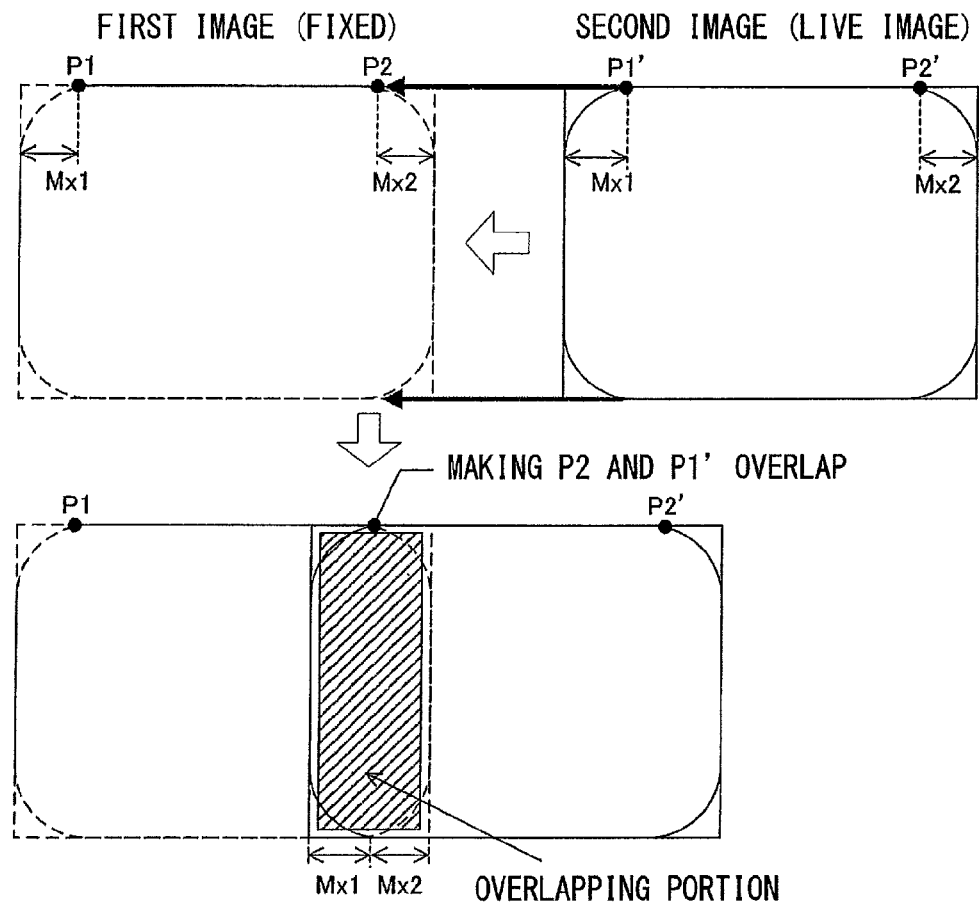
FIG. 11 illustrates an overlap process when an image is identified as being in the shading state in the fourth embodiment.

FIG. 11 illustrates an overlapping process (S125) executed when the state indicated by the captured image is identified as the shading state in this embodiment (implementation example 1). The first image indicates an image having a shading characteristic for which the process of S102 or S108 has been executed and which is fixedly displayed. The second image is a live image.

Assume that coordinates at which a line linking the positions of pixels having a brightness difference that exceeds the threshold value th1 intersects with the top end of the view angle are respectively P1 and P2 from the left side. Also assume that such coordinates are respectively P1' and P2' from the left side, similarly to the second image.

Further assume that a width from the coordinates P1 of the first image (or the coordinates P1' of the second image) to the left end of the view angle is Mx1, and a width from the coordinates P2 of the first image (or coordinates P2' of the second image) to the right end of the view angle is Mx2.

The first image and the second image are made to overlap by moving the stage to the position at which an intersection point P2 of the first image and an intersection point P1' of the second image overlap, and the images are shot and synthesized. Then, the width of the overlapping portion obtained by connecting the first and the second images results in a total (Mx1+Mx2) of the width Mx2 from the P1' of the second image to the left end of the view angle and the width Mx1 from the P2 of the first image to the right end of the view angle. This (Mx1+Mx2) results in the amount of overlap between the images having the shading characteristic.

Figure 12:
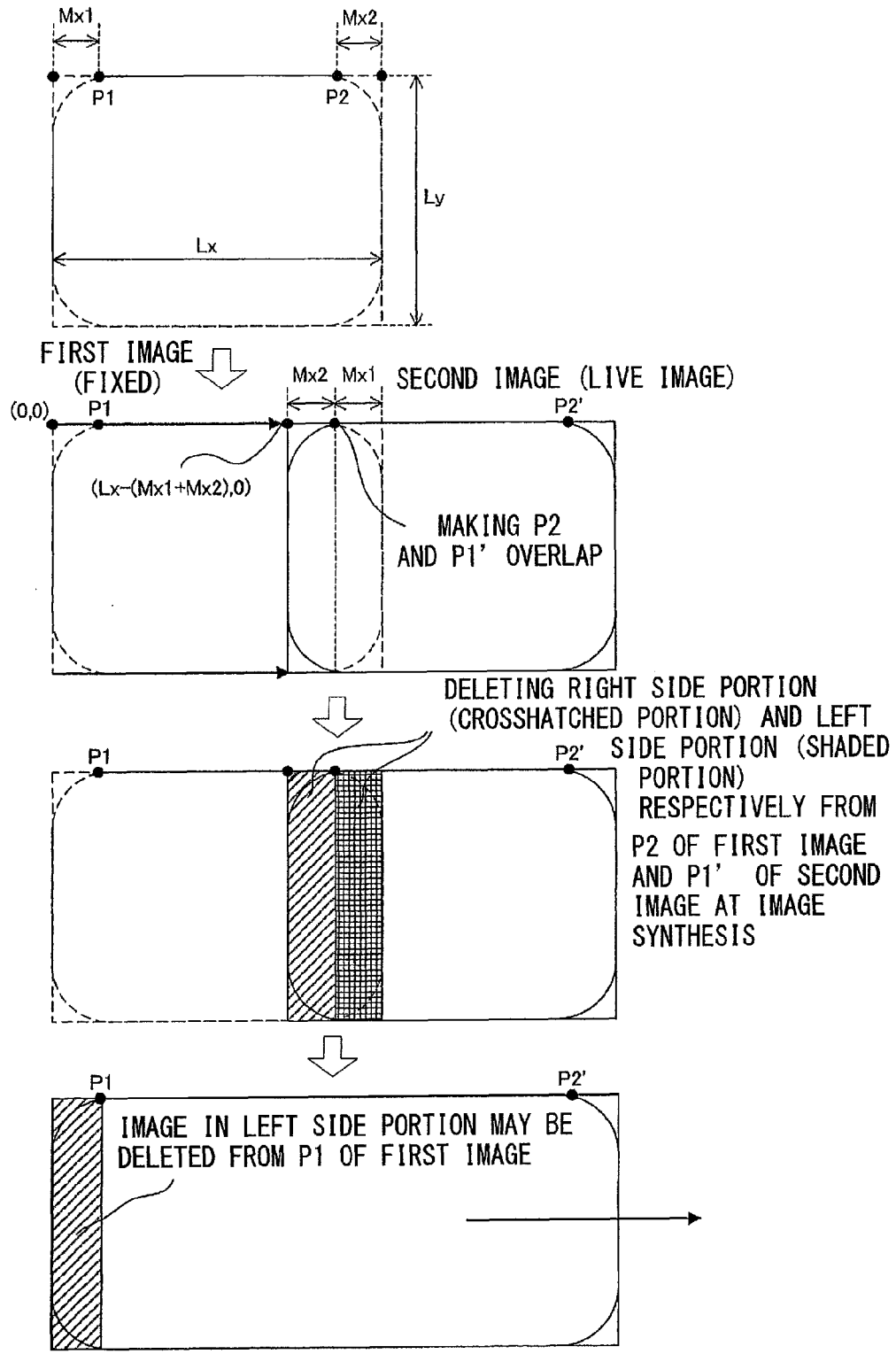
FIG. 12 is a schematic illustrating the case of generating a synthesized image by moving a stage to the right in the horizontal direction in the shading state in the fourth embodiment (implementation example 1)

FIG. 12 is a schematic illustrating the case of generating a synthesized image by moving the stage 12 to the right in the horizontal direction in the shading state in this embodiment (implementation example 1). Assuming that the position to be reached of the stage 12 which is calculated in S126 is the position having the coordinates of the upper left corner point of a partitioned image to be obtained next, the position to be reached results in (Lx-(Mx1+Mx2), 0) when the coordinates of the upper left corner point of the obtained synthesized image is the origin (0, 0).

Accordingly, the stage position instructing unit 31 guides the user to move the stage 12 to the right in the horizontal direction by Lx-(Mx1+Mx2). The user actually moves the stage 12 to the position to be reached in accordance with the guidance to determine an image synthesis position. At the image synthesis position determined by the user, a still image of the second image is captured.

The synthesized image generating unit 27 generates a synthesized image by deleting the image portion (crosshatched portion of FIG. 12) on the right side and the image portion (shaded portion of FIG. 12) on the left side respectively from the coordinates P2 of the first image and the coordinates P1' of the second partitioned image, and by connecting the side portions of the first and the second images from which the image portions are deleted. Moreover, the image portion from P1 to the left end in the first synthesized image may be deleted when the synthesized image is generated.

Figure 13:
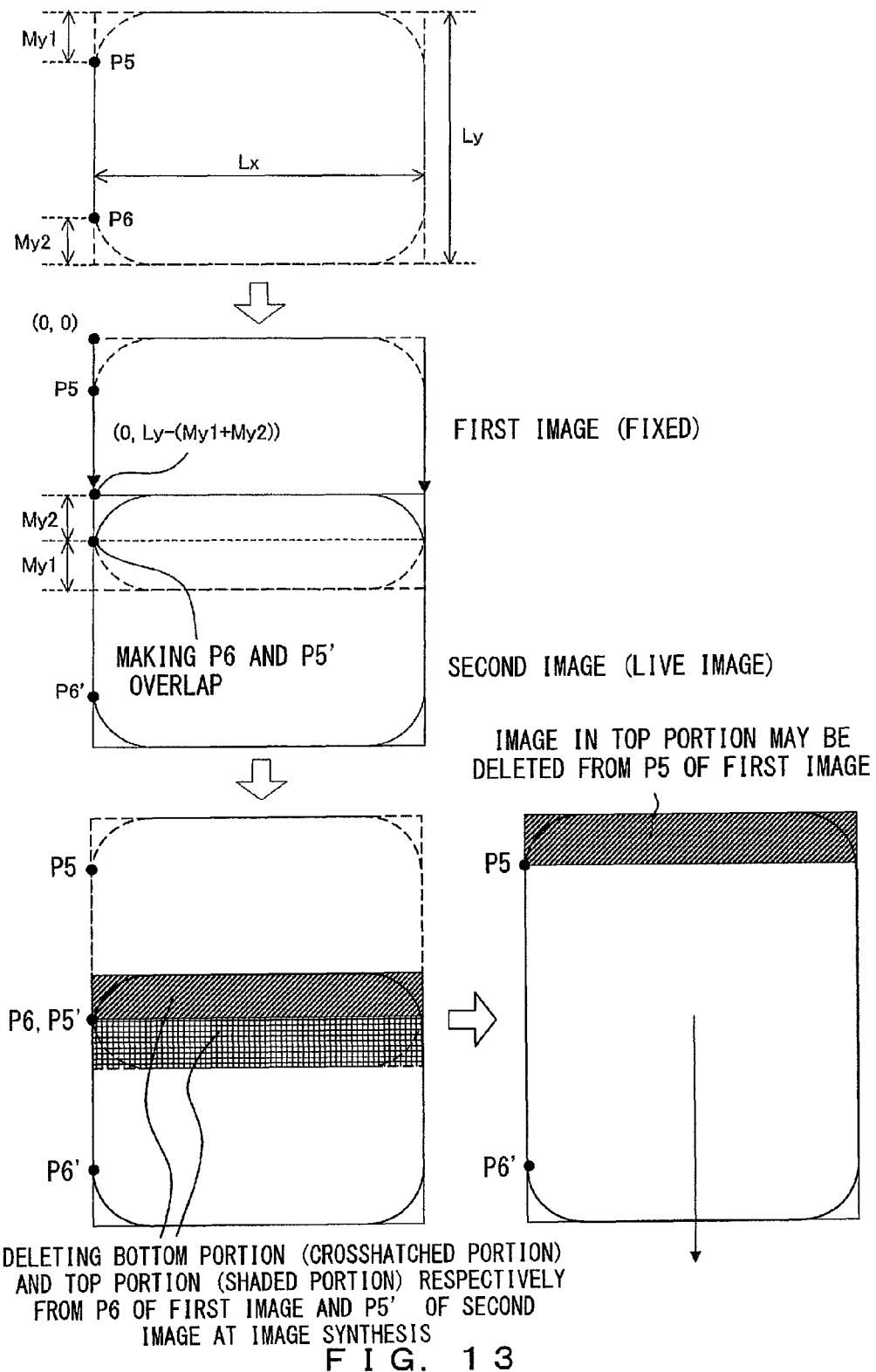
FIG. 13 is a schematic illustrating the case of generating a synthesized image by moving the stage downward in the vertical direction in the shading state in the fourth embodiment (implementation example 1)

FIG. 13 is a schematic illustrating the case of generating a synthesized image by moving the stage 12 downward in the vertical direction in the shading state in this embodiment (implementation example 1). Assume that coordinates at which a line linking pixels having a brightness difference that exceeds the threshold value th1 intersects with the left end of the view angle in the first image for which the process of S102 or S108 has been executed and which is fixedly displayed are respectively P5 and P6 from the upper side. Also assume that such coordinates are P5' and P6' from the top side, similarly to the live image (second image).

Further assume that a height in the vertical direction from the coordinates P5 (or the coordinates P5' of the second image) to the top end of the view angle in the first image is My1, and a height in the vertical direction from the coordinates P6 (or the coordinates P6' of the second image) to the bottom end of the view angle in the first image is My2. Assuming that the upper left corner point of the first image is the origin (0, 0), the stage position instructing unit 31 guides the user to move the stage 12 downward in the vertical direction so that the upper left corner point of the second image moves to the position to be reached (0, Ly-(My1+My2)). The user actually moves the stage 12 to the position to be reached in accordance with the guidance, and determines an image synthesis position. The user determines the image synthesis position at which a still image of the second image is captured.

The synthesized image generating unit 27 forms a synthesized image by deleting an image portion (crosshatched portion of FIG. 13) from P6 to the bottom in the first image, and an image portion (shaded portion of FIG. 13) from P5' to the top in the second partitioned image, and by connecting the side portions of the first and the second images from which the image portions are deleted. When the synthesized image is generated, the image portion from P5 to the top end in the first synthesized image may be deleted.

According to this embodiment, the lens characteristic of an objective lens is identified on the basis of the shape of a line linking pixels adjacent to a pixel having a brightness difference, which does not exceed a threshold value, among pixels having a brightness difference, which exceeds the threshold value, between the brightness of a pixel in the vicinity of the center of an image and that of a peripheral pixel, and the amount of overlap can be determined in accordance with the identified lens characteristic. Accordingly, an overlapping position more suitable for an image connection can be obtained when images to be connected are made to overlap. Moreover, an evenly synthesized image can be generated without making seams appear between images to be connected.

IMPLEMENTATION EXAMPLE 2

In implementation example 1, the brightness difference measuring unit 33 identifies whether or not an image is an image in the shading state on the basis of the shape of a line linking pixels adjacent to a pixel having a brightness difference which does not exceed a threshold value from among pixels having the brightness difference ΔIi exceeding the threshold value th1. In the meantime, in the implementation example 2, the brightness difference measuring unit 33 identifies, by using a predetermined sample, whether or not an image is an image in a lens distortion state.

FIG. 14 is an explanatory view of identifying the lens distortion state by using a grid pattern in this embodiment (implementation example 2). If a sample 110 in the grid pattern is observed with an objective lens having a low magnification instead of the sample 13, an image 110a in an orthogonal grid pattern is obtained. Thereafter, if an image of sample 110 in the grid pattern is captured after the objective lens of the low magnification is switched to an objective lens having a high magnification, a (radial) lens distortion where the grid pattern forms curves bending from the top, the bottom, the left, and the right of the view angel toward the outside as indicated by reference numeral 111, or a (bobbin) lens distortion where the grid pattern forms curves bending from the top, the bottom, the left, and the right of the view angle toward the inside as indicated by reference numeral 112 sometimes occurs in accordance with the characteristic of the lens distortion of the objective lens.

Figure 15:
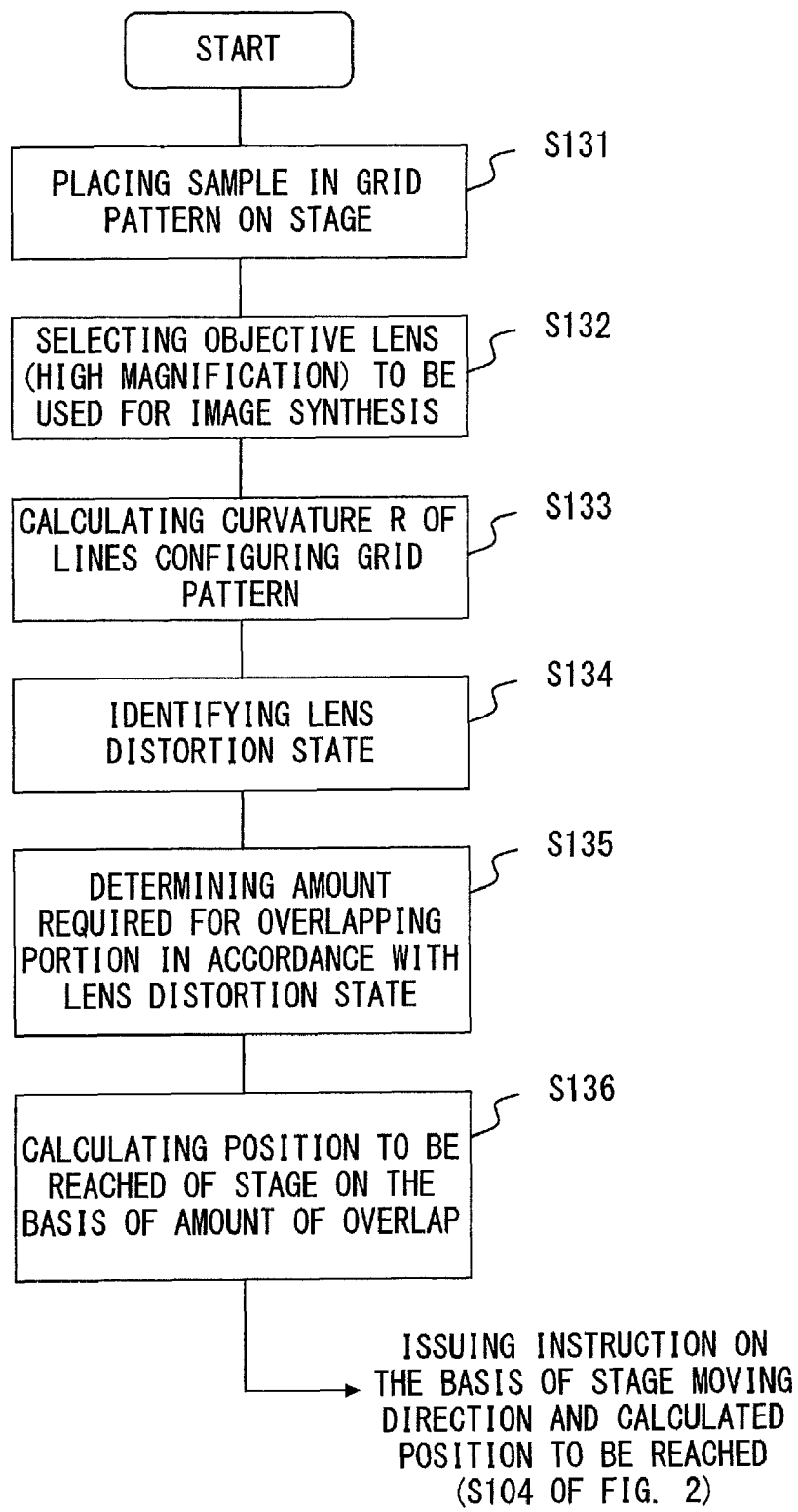
FIG. 15 is a flowchart of a process for determining the amount of overlap when captured images in the shading state are made to overlap in the fourth embodiment (implementation example 2)

FIG. 15 is a flowchart of a process for determining the amount of overlap when captured images in the shading state are made to overlap in this embodiment (implementation example 2).

Initially, sample 110 in the grid pattern is placed at a position of the stage 12 which intersects with the observation optical path instead of the sample 13 (S131). Then, an objective lens 18 of a high magnification to be used for an image synthesis is selected (S132). At this time, S101 to S103 of FIG. 2 are executed.

Next, the brightness difference measuring unit 33 reads a shot image recorded in the partitioned image recording unit 26, and calculates a curvature R of a predetermined line that configures the grid pattern within the image (S133). Then, the brightness difference measuring unit 33 identifies the distortion state as the lens distortion state if the grid pattern forms curves bending from the top, the bottom, the left, and the right of the view angle toward outside (indicated by reference numeral 111 of FIG. 14), or if the grid pattern forms curves bending from the top, the bottom, the left, and the right of the view angle toward inside (indicated by reference numeral 112 of FIG. 14). Specifically, the brightness difference measuring unit 33 obtains the curvature R of the line configuring the predetermined grid pattern, and identifies the lens characteristic as the lens distortion state if the curvature R exceeds a curvature threshold value Rth (S134). The curvature R of lines that configure the grid pattern becomes higher from the center of the image toward the outside. At this time, the brightness difference measuring unit 33 identifies a line 131 (boundary line) having a minimum curvature from among lines having the curvature R that exceeds the curvature threshold value Rth.

The overlap amount calculating unit 34 determines the amount of overlap in accordance with the lens distortion state identified in S124, namely, the boundary line 131 identified in S134 (S135). The overlap amount calculating unit 34 calculates the position to be reached of the stage on the basis of the amount of overlap determined in S135 (S136). The processes of S135 and S136 will be described later.

The stage position instructing unit 31 instructs the display unit 5 to display the arrow for prompting a user to move the stage to the determined position to be reached of the stage as described in the first embodiment on the basis of the position to be reached determined by the overlap amount calculating unit 34 (S104 of FIG. 2). Subsequent steps are similar to those of the flow illustrated in FIG. 2.

Figures 16A, 16B:
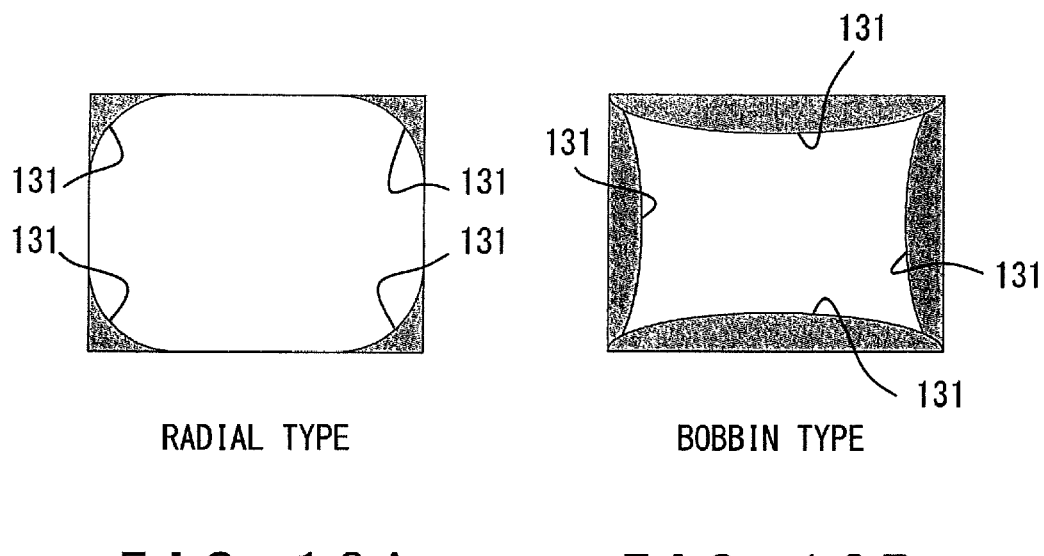
FIGS. 16A and 16B illustrate boundary lines within a captured image, in which a lens distortion occurs, in the fourth embodiment (implementation example 2)

FIGS. 16A and 16B illustrate boundary lines 131 within a captured image where a lens distortion occurs in this embodiment (implementation example 2). The boundary lines 131 are configured with a line having a minimum curvature from among lines the curvature R of which exceeds the curvature threshold value Rth and which configure a grid pattern.

FIG. 16A illustrates the boundary lines 131 in the radial lens distortion state indicated by reference numeral 111 of FIG. 14. In FIG. 16A, the boundary lines 131 form a concentric curve bending from the top, the bottom, the left, and the right of the view angle toward outside.

FIG. 16B illustrates the boundary lines 131 in the bobbin lens distortion state indicated by reference numeral 112 of FIG. 14. In FIG. 16B, the boundary lines 131 form nearly a semicircle curve from the top, the bottom, the left, and the right of the view angle toward inside.

FIG. 17 illustrates an overlap process executed when the lens characteristic is identified as the bobbin lens distortion state in this embodiment (implementation example 2). The first image is an image in which a lens distortion occurs for which the process of S102 or S108 has been executed and which is fixedly displayed. The second image is a live image.

First assume that the coordinates of the vertex of the boundary lines are P3 and P4. Also assume that a width in the horizontal direction from the coordinates P3 of the first image (or the coordinates P3' of the second image) to the left end of the view angle is Mx3, and a width in the horizontal direction from the coordinates P4 of the first image (or the coordinates P4' of the second image) to the right end of the view angle is Mx4.

Similarly assume that such coordinates are P3' and P4' from the left side in the second image. Here, the second image is made to overlap on the right side of the first image. The stage is moved to a position at which the coordinates P4 of the first image and the coordinates P3' of the second image overlap. Then, these two images are shot and synthesized.

As a result, the width of the overlapping portion obtained by connecting the first and the second images results in the total (Mx3+Mx4) of the width Mx3 from the P3' of the second image to the left end of the view angle, and the width Mx4 from the P4 of the first image to the right end of the view angle. This is the amount of overlap between the images having the lens distortion characteristic.

The overlap amount calculating unit 34 determines, on the basis of the amount of overlap, the position to be reached, to which the stage is moved, when a partitioned image is obtained. Namely, the overlap amount calculating unit 34 determines the coordinates within the image which are further inward than the coordinates of the right end of the first image by (Mx3+Mx4) to be the position to be reached.

The stage position instructing unit 31 makes the display unit 5 display the arrow for prompting a user to move the stage to the determined position to be reached of the stage as described in the first embodiment on the basis of the position to be reached determined by the overlap amount calculating unit 34 (S104 of FIG. 2). Subsequent steps are similar to those of the flow illustrated in FIG. 2.

Additionally, if the lens distortion characteristic is identified as the radial lens distortion state, the overlap process described with reference to FIG. 11 is executed by the overlap amount calculating unit 34. Assume that the coordinates where the boundary lines 131 intersect with the top end of the view angle are respectively P1 and P2 from the left side. Also assume that such coordinates are respectively P1' and P2' from the left side similarly in the second image.

Further assume that a width from the coordinates P1 of the first image (or the coordinates P1' of the second image) to the left end of the view angle is Mx1, and a width from the coordinates P2 (or the coordinates P2' of the second image) to the right end of the view angle is Mx2.

The first and the second images are made to overlap by moving the stage to the position where an intersection point P2 of the first image and an intersection point P1' of the second image overlap. Then, the images are shot and synthesized. Since subsequent steps are similar to those described with reference to FIG. 11, their descriptions are omitted here.

According to this embodiment (implementation example 2), the state of a lens distortion is identified on the basis of the shape of a grid pattern, and the amount of overlap can be determined in accordance with the identified state of the lens distortion. Accordingly, an overlapping position more suitable for an image connection can be obtained when images to be connected are made to overlap. Moreover, an evenly synthesized image can be generated without making seams appear between images to be connected.

According to the present invention, the stage can be moved to a destination position by instructing the direction of moving the stage when images are connected with a manual microscope. As a result, a burden on user operations can be reduced, and image obtainment and an image synthesis can be made at an optimum position. Moreover, even if a user moves the stage in a direction different from a guided destination, a warning is issued. This prevents the user from performing an erroneous operation.

Additionally, the amount of overlap can be optimally determined even if a brightness slope or a distortion is caused by shading or a lens distortion due to the characteristic of a lens in the image quality of a synthesized image. Accordingly, an evenly synthesized image can be generated without making seams appear between images to be connected. Moreover, the amount of overlap is determined before an image synthesis is made, whereby the amount of time required for correction processes can be reduced.

The present invention is not limited to the above described embodiments, and can be configured or embodied in a variety of ways within a scope that does not depart from the gist of the present invention. Moreover, the above described first to fourth embodiments may be combined in any way within a practical limit.

According to a microscope system of the present invention, a seamless image having a wide view angle can be obtained only by repeatedly capturing an image while manually moving a stage in accordance with the guidance of moving the stage without making a user aware of adjusting the position of the stage.

What is claimed is:

1. A microscope system for obtaining an image having a wide view angle by repeatedly capturing an image with an objective lens having a high magnification while moving a stage, and by connecting captured images having a small view angle, comprising:
    a stage on which a sample is placed;
    a stage driving unit for moving the stage at least in a vertical direction with respect to an optical axis;
    a stage position detecting unit for detecting a position of the stage;
    an image capturing unit for capturing an optical image of the sample;
    a position to be reached determining unit for determining a position to be reached, which is a next image capturing position of the stage and at which a next image is to be captured, on the basis of a state of the captured image and the position of the stage; and
    a stage move guiding unit for prompting a user to move the stage to the position to be reached on the basis of the detected position of the stage and the determined position to be reached.

2. The microscope system according to claim 1, wherein the position to be reached determining unit comprises
    a brightness difference measuring unit for measuring a brightness difference between a brightness of a predetermined pixel and a brightness of an arbitrary pixel other than the predetermined pixel within the image, and
    an overlap amount determining unit for determining an amount of overlap in corresponding side portions of a first image that is captured at a current image capturing position and a second image that is an image to be captured next and that is the image in a preset scanning direction, and for determining the position to be reached, which is a position at which the second image is captured, to be a position further inward than the side portion of the scanning direction side of the first image by the amount of overlap.

3. The microscope system according to claim 2, wherein the brightness difference measuring unit measures a brightness difference between a brightness of a pixel at a central position and a brightness of a pixel in a side portion within the image.

4. An operation method of a microscope system for obtaining an image having a wide view angle by repeatedly capturing an image with an objective lens having a high magnification while moving a stage on which a sample is placed and which can be moved at least in a vertical direction with respect to an optical axis, and by connecting captured images having a small view angle, comprising:
    detecting a position of the stage;
    capturing an optical image of the sample;
    determining a position to be reached, which is a next image capturing position of the stage and at which a next image is to be captured, on the basis of a state of the captured image and the position of the stage; and
    prompting a user to move the stage to the position to be reached on the basis of the detected position of the stage and the determined position to be reached.

5. A microscope system for obtaining an image having a wide view angle by repeatedly capturing an image with an objective lens having a high magnification while moving a stage, and by connecting captured images having a small view angle, comprising:
    a stage on which a sample is placed;
    a stage driving unit for moving the stage at least in a vertical direction with respect to an optical axis;
    a stage position detecting unit for detecting a position of the stage;

an image capturing unit for capturing an optical image of the sample;

a position to be reached determining unit for determining a position to be reached, which is a next image capturing position of the stage and at which a next image is to be captured, on the basis of a state of the captured image and the position of the stage; and an image synthesizing unit for generating a synthesized image by sequentially connecting an image captured at the position to be reached.

6. The microscope system according to claim 5, wherein the position to be reached determining unit comprises a brightness difference measuring unit for measuring a brightness difference between a brightness of a predetermined pixel and a brightness of an arbitrary pixel other than the predetermined pixel within the image, and an overlap amount determining unit for determining, in accordance with the brightness difference, an amount of overlap in corresponding side portions of a first image that is captured at a current image capturing position and a second image that is an image to be captured next and that is the image in a preset scanning direction, and for determining the position to be reached, which is a position at which the second image is captured, to be a position further inward than the side portion of the scanning direction side of the first image by the amount of overlap.

7. The microscope system according to claim 6, wherein the brightness difference measuring unit measures a brightness difference between a brightness of a pixel at a central position and a pixel of a side portion within the image.

* * * * *